(12) United States Patent
Hiemstra et al.

(10) Patent No.: US 8,776,502 B2
(45) Date of Patent: Jul. 15, 2014

(54) SYSTEM AND METHOD FOR REGENERATING AN AUXILIARY POWER UNIT EXHAUST FILTER

(75) Inventors: John Hiemstra, Lakeville, MN (US); Eivind Stenersen, River Falls, WI (US); Wenzhong Zhang, Savage, MN (US); Allan T. Hovda, Savage, MN (US); Gary Dale Reeves, Lakeville, MN (US); Josh Kundert, Rosemount, MN (US); Wayne M. Wagner, Apple Valley, MN (US); Todd R. Taubert, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 701 days.

(21) Appl. No.: 12/496,282

(22) Filed: Jul. 1, 2009

(65) Prior Publication Data

US 2010/0139247 A1    Jun. 10, 2010

Related U.S. Application Data

(60) Provisional application No. 61/133,980, filed on Jul. 3, 2008.

(51) Int. Cl.
*F01N 3/00* (2006.01)

(52) U.S. Cl.
USPC .............. 60/295; 60/274; 60/289; 60/303; 60/311

(58) Field of Classification Search
USPC ............ 60/274, 289, 293, 295, 297, 303, 311
See application file for complete search history.

(56) References Cited

U.S. PATENT DOCUMENTS

| | | |
|---|---|---|
| 3,499,260 A | 3/1970 | Forman |
| 3,499,269 A | 3/1970 | Bois |
| 4,167,852 A | 9/1979 | Ludecke |
| 4,211,075 A | 7/1980 | Ludecke et al. |
| 4,270,936 A | 6/1981 | Mann |
| 4,276,066 A | 6/1981 | Bly et al. |
| 4,276,071 A | 6/1981 | Outland |
| 4,319,896 A | 3/1982 | Sweeney |
| 4,573,317 A | 3/1986 | Ludecke |
| 4,851,015 A | 7/1989 | Wagner et al. |
| 4,867,768 A | 9/1989 | Wagner et al. |

(Continued)

FOREIGN PATENT DOCUMENTS

| | | |
|---|---|---|
| GB | 2 134 407 A | 8/1984 |
| JP | 2003-27922 | 1/2003 |
| WO | WO 2005/028824 A1 | 3/2005 |
| WO | WO 2006/096244 A1 | 9/2006 |

OTHER PUBLICATIONS

Cleaire Products Catalog™, Horizon, May 10, 2006, 7 Pages.

(Continued)

*Primary Examiner* — Binh Q Tran
(74) *Attorney, Agent, or Firm* — Merchant & Gould P.C.

(57) ABSTRACT

This disclosure relates to a method for controlling a system for regenerating a diesel particulate filter. The method includes monitoring an engine run time that has lapsed since a previous regeneration event. The method also includes monitoring backpressure behind the diesel particulate filter. The method further includes triggering a regeneration flag if the engine run time that lapsed since the previous regeneration event reaches a predetermined time limit and the backpressure exceeds a minimum value.

20 Claims, 18 Drawing Sheets

(56) References Cited

U.S. PATENT DOCUMENTS

| | | | |
|---|---|---|---|
| 4,878,928 A | 11/1989 | Wagner et al. | |
| 4,899,540 A | 2/1990 | Wagner et al. | |
| 4,902,487 A | 2/1990 | Cooper et al. | |
| 5,024,054 A * | 6/1991 | Barris et al. | 60/274 |
| 5,053,603 A | 10/1991 | Wagner et al. | |
| 5,101,095 A | 3/1992 | Wagner et al. | |
| 5,203,166 A | 4/1993 | Miller | |
| 5,355,973 A | 10/1994 | Wagner et al. | |
| 5,388,400 A | 2/1995 | Hoppenstedt et al. | |
| 6,922,891 B1 | 8/2005 | Marino, Jr. | |
| 6,990,803 B2 * | 1/2006 | Koga et al. | 60/295 |
| 7,310,941 B2 * | 12/2007 | Kuboshima et al. | 60/297 |
| 7,343,738 B2 * | 3/2008 | Tsutsumoto et al. | 60/295 |
| 7,357,829 B2 | 4/2008 | Ehlers | |
| 7,384,455 B2 | 6/2008 | Sellers et al. | |
| 7,410,521 B2 | 8/2008 | Sellers et al. | |
| 7,410,529 B2 | 8/2008 | Sellers et al. | |
| 7,419,532 B2 | 9/2008 | Sellers et al. | |
| 7,421,839 B2 | 9/2008 | Igarashi | |
| 7,458,207 B2 | 12/2008 | Ehlers | |
| 7,462,222 B2 | 12/2008 | Sellers et al. | |
| 7,562,523 B2 * | 7/2009 | Yezerets et al. | 60/295 |
| 7,574,857 B2 * | 8/2009 | Yahata et al. | 60/286 |
| 7,578,123 B2 * | 8/2009 | Ohmura | 60/297 |
| 7,582,141 B2 | 9/2009 | Ehlers | |
| 7,877,985 B2 * | 2/2011 | Hashizume | 60/292 |
| 2004/0226287 A1 | 11/2004 | Edgar et al. | |
| 2005/0153828 A1 | 7/2005 | Uekusa et al. | |
| 2005/0160724 A1 | 7/2005 | Valentine et al. | |
| 2006/0070360 A1 | 4/2006 | Sellers et al. | |
| 2006/0120936 A1 | 6/2006 | Alive et al. | |
| 2006/0137329 A1 | 6/2006 | Lowe et al. | |
| 2006/0168952 A1 | 8/2006 | Opris | |
| 2006/0191412 A1 | 8/2006 | Sellers et al. | |
| 2008/0028753 A1 | 2/2008 | Wagner et al. | |

OTHER PUBLICATIONS

Engine Control Systems, "CombiClean™—the diesel particulate filter cleaning station for all your filter cleaning needs," Jan. 2006, 3 Pages.

Kilcarr, S., "Truck Engine Emissions Update: The Road to '07," *Waste Age*, pp. 1-4 (Dec. 1, 2004).

* cited by examiner

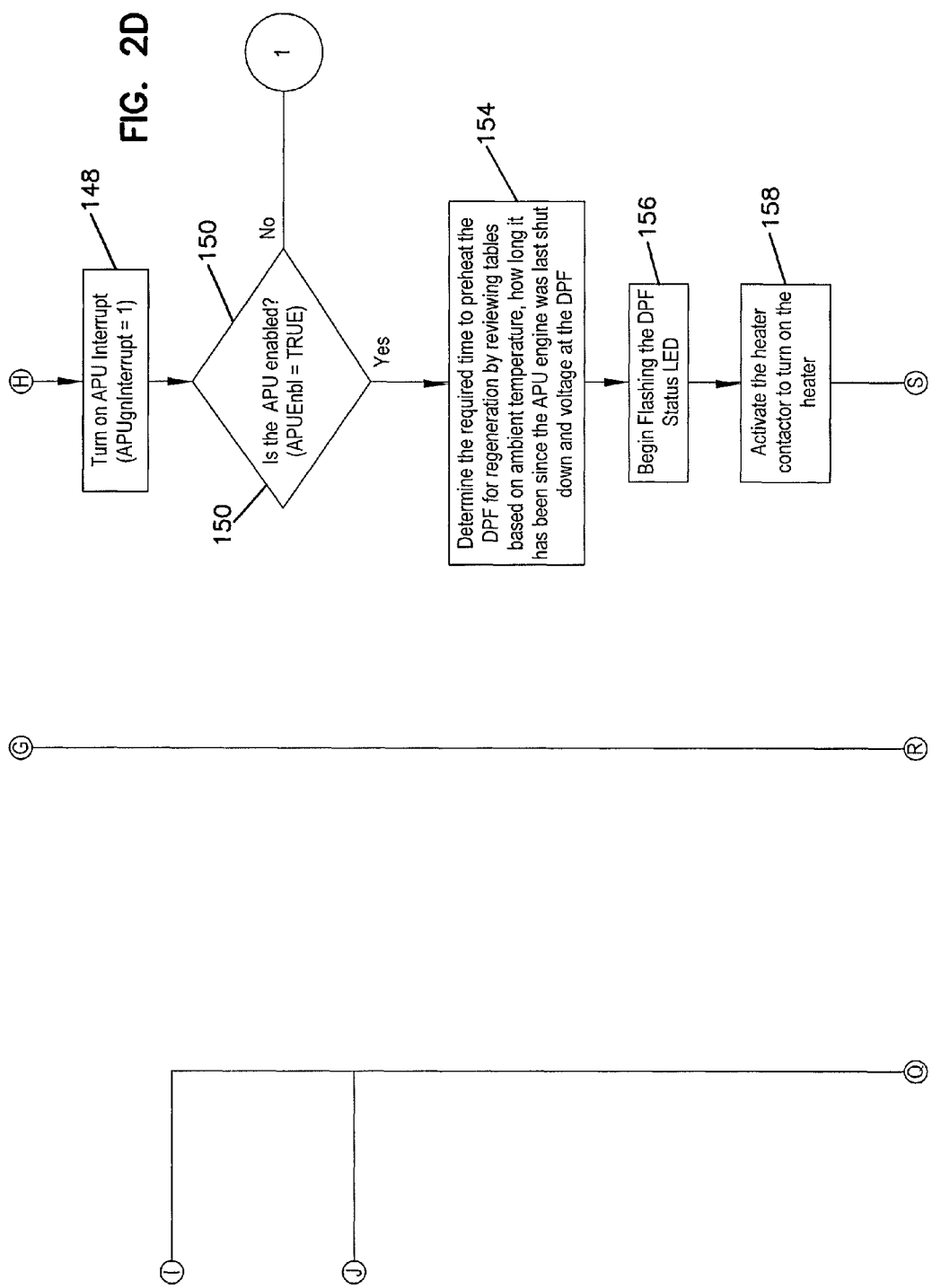

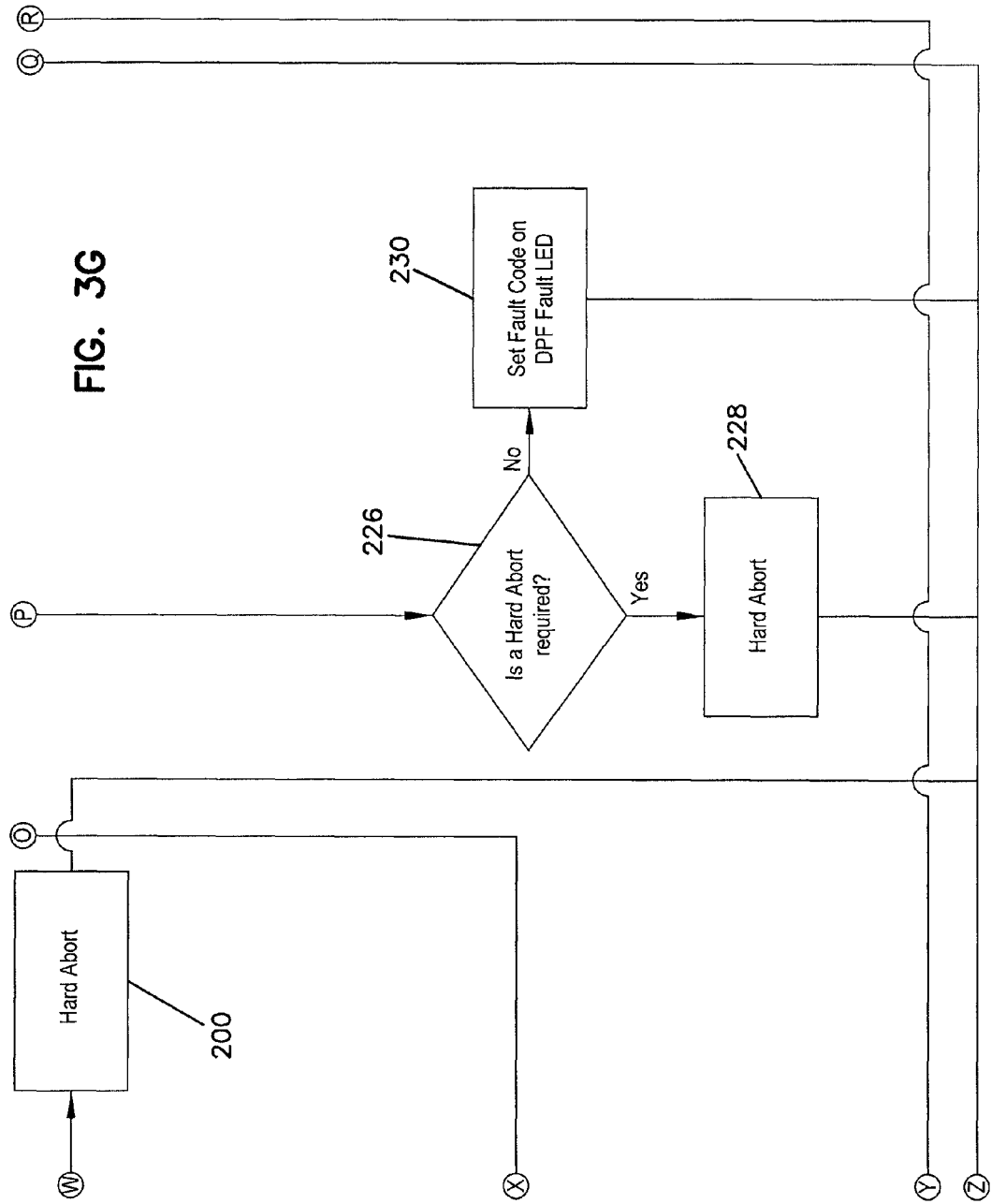

SYSTEM AND METHOD FOR REGENERATING AN AUXILIARY POWER UNIT EXHAUST FILTER

CROSS REFERENCE TO RELATED APPLICATION

This application claims the benefit of U.S. Provisional Patent Application Ser. No. 61/133,980, filed Jul. 3, 2008, which application is hereby incorporated by reference in its entirety.

TECHNICAL FIELD

The present invention relates generally to systems and methods for regenerating diesel engine exhaust filters.

BACKGROUND

Engine emission regulations have become increasingly stringent and more widely applicable. For example, recent regulations implemented by the California Air Resources Board have required auxiliary power units provided on 2007 or newer trucks to comply with the level 3 emissions standard. The level 3 emissions standard requires an 85 percent reduction in particulate material as compared to baseline emissions generated by the source of exhaust emissions.

Engine exhaust filters suitable for removing particulate material from an exhaust stream can have a variety of constructions. One type of exhaust filter includes a cellular ceramic core defining a honeycomb of channels having plugged ends. Filters having this construction are disclosed in U.S. Pat. Nos. 4,276,071 and 4,851,015. Other exhaust filters include a filter media defined by a plug of wire mesh. Filters having this construction are disclosed in U.S. Pat. Nos. 3,499,269 and 4,902,487.

While existing exhaust filters can be effective at removing particulate material from diesel engine exhaust, such filters have a tendency to become over loaded with particulate material overtime thereby causing excessive amounts of backpressure to be generated behind the filters. To overcome this problem, different types of regeneration systems have been developed. Some regeneration systems rely on heat present in the exhaust gas from the engine to combust particulate material accumulated on the exhaust filter. However, such systems are not ideal for smaller diesel engines of the type typically used for auxiliary power units because such diesel engines generally do not emit exhaust having a high enough temperature to reliably regenerate an exhaust filter. Other systems include heaters (e.g., gas burners or electrical resistance type heaters) the provide sufficient heat to actively regenerate an exhaust filter. However, such systems can be difficult to control and are often quite expensive. Therefore, improvements are needed in exhaust filter regeneration systems.

SUMMARY

Aspects of the present disclosure relate to systems and methods for regenerating an exhaust filter. Other aspects of the present disclosure relate to exhaust filtration systems and exhaust filter regeneration systems for auxiliary power units.

Examples of a variety of aspects in addition to those described above are set forth in the description that follows. It is to be understood that both the foregoing general description and the following detailed description are exemplary and explanatory and are not restrictive of the broad inventive aspects which provide a basis for the examples disclosed herein.

BRIEF DESCRIPTION OF THE DRAWINGS

FIG. 2D is a fragmentary view of the flow chart of FIG. 2 taken within the box labeled FIG. 2D;

FIG. 3G is a fragmentary view of the flow chart of FIG. 3 taken within a box labeled FIG. 3G.

DETAILED DESCRIPTION

Figure 1:
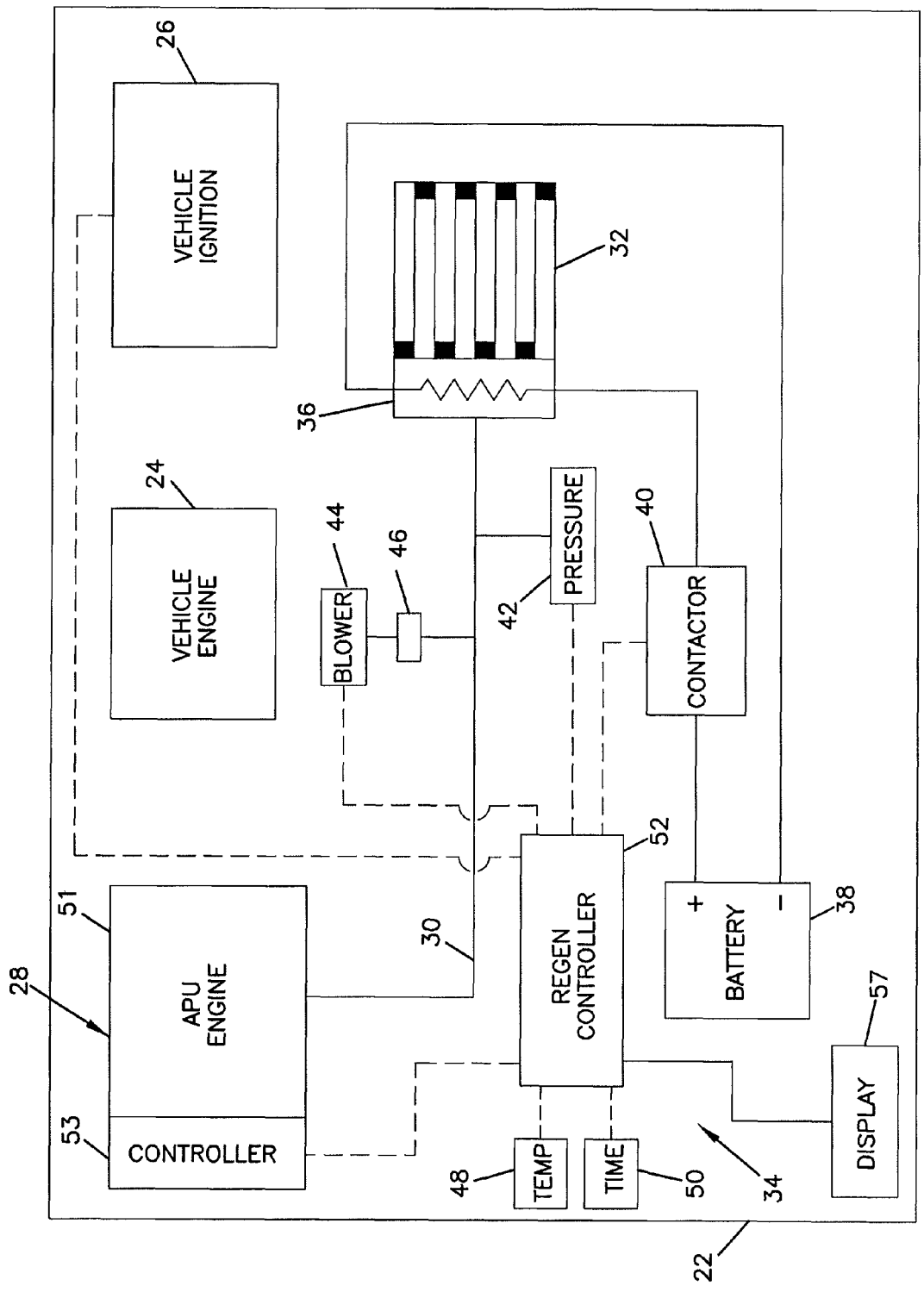
FIG. 1 schematically shows an example exhaust filtration system for an auxiliary power unit.

FIG. 1 shows a system 20 in accordance with the principles of the present disclosure. The system 20 includes a vehicle 22 (e.g., a truck) having an engine 24 and a engine ignition 26. An auxiliary power unit 28 (APU) is carried by the vehicle 22. Exhaust gas from the auxiliary power unit 28 is carried by an exhaust conduit 30 and is routed through a filter 32 adapted for removing particulate material and possibly other contaminants before the exhaust gas is discharged to the atmosphere. The vehicle 22 also carries a regeneration system 34 for regenerating the filter 32 when the filter 32 becomes loaded with particulate material. The regeneration system 34 includes a heater 36 (e.g., a resistive heater) positioned at an upstream face of the filter 32. The heater 36 can be powered by a battery 38. The battery 38 can be the vehicle battery or can be a separate battery carried by the vehicle. A contactor 40 controls the flow of electricity to the heater 36. The regeneration system 34 also includes a pressure sensor 42 for measuring/detecting the back pressure at the upstream side of the filter 32, a blower 44 for providing combustion air to the filter 32 during a regeneration event, and a blower valve 46. During a regeneration event, the valve 46 directs air from the blower 44 through the conduit 30 to the filter 32. When the APU is running, the valve 46 prevents the exhaust gas from flowing toward the blower 44. The regeneration system 34 further includes an ambient temperature sensor 48 and a timer 50. Additionally, the regeneration system 34 includes a regeneration controller 52 that interfaces with the ignition 26, the APU 28, the blower 44, the valve 46, the pressure sensor 42, the contactor 40, the temperature sensor 48, and the timer 50. In other embodiments, the regeneration controller may interface with temperature sensors that monitor the temperature within the conduit 30 at locations upstream and downstream of the filter 32. In still other embodiments, the regeneration controller 52 or other components can be used to modulate (e.g., provide pulse width modulation) the voltage provided to the heater 36 so as to control the temperature of the filter 32 during a regeneration event. The controller can output information to a display 57 (e.g., a monitor or control panel) and can receive inputs from an input source (e.g., a keyboard).

While the regeneration system 34 has been shown on a vehicle 22, it will be appreciated that the system can be used to control the regeneration of a filter provided for filtering particulate material from any type of diesel engine. For example, systems in accordance with the principles of the present disclosure can be used to regenerate filters used to filter exhaust gas from lawn equipment, skid steers, tractors, refrigeration units, construction equipment, or any other equipment utilizing diesel engines. Moreover, the auxiliary power unit 28 may be mounted on a truck, trailer, refrigeration unit or any number of other structures.

The APU 28 is preferably used to provide electricity, heating, cooling, and other cab functions to the vehicle 22 when the vehicle 22 is not being driven. A typical APU includes a diesel engine 51 having a power rating of 12 horsepower or less. Such engines typically generate an exhaust stream having a temperature in the range of 200° F.-500° F. with occasional relatively short temperature extrusions that may reach or exceed 600° F. The APU 28 can also include a controller 53 for controlling operation of the engine 51.

The filter 32 preferably includes a diesel particulate filter having a cellular core defining a honeycomb of channels having plugged ends. Filters having this type of construction are disclosed in U.S. Pat. Nos. 4,276,071 and 4,851,015 that are hereby incorporated by reference in their entireties. It is preferred for the cellular core to be manufactured of a robust material such as silicon carbide since this type of material is capable of readily withstanding high temperature gradients. However, other materials such as cordierite or other ceramic materials could be used as well.

In certain embodiments, the pressure sensor 42 can be used to monitor the back pressure behind the filter 32 during operation of the auxiliary power unit 28. The system back pressure is directly related to filter loading. Therefore, the back pressure can be used as a triggering condition used to detect whether filter regeneration is needed. For example, an indicator at display 57 (e.g., a visual indicator such as an illuminated light, flashing light, etc.) or other indicator (e.g., an audible indicator such as a buzzer or chime) may be activated if the back pressure behind the filter 32 rises above a predetermined level corresponding to the need for a filter regeneration. Regeneration of the filter 32 may also be triggered based on operational time of the APU engine. For example, once the APU engine is operated for a predetermined amount of time without the filter 32 being regenerated, a regeneration indicator may be activated to tell the operator that the filter should be regenerated. In certain embodiments, it may be possible for the operator to manually start regeneration of the filter 32 regardless of whether a regeneration triggering condition has been sensed or otherwise detected. In still other embodiments, the regeneration system 34 may automatically start regeneration of the filter 32 if a regeneration triggering condition is detected. In still a further embodiment, it is required for the operator to manually start regeneration once a regeneration triggering condition has been detected.

The heater 36 is preferably a resistive heating element (e.g., a resistive coil) that heats when electricity is passed therethrough. In certain embodiments, the resistive heating element is located within 3 inches of the upstream face of the filter 32. In still other embodiments, the resistive heating element is located within 2 inches of the upstream face of the filter 32. In still other embodiments, the resistive heating element is located within 1 inch of the upstream face of the filter 32. In still a further embodiment, the resistive heating element is located within $\frac{1}{4}$ to $\frac{1}{2}$ of an inch of the upstream face of the filter 32.

Regeneration of the filter 32 can occur in multiple phases. For example, in one embodiment, the regeneration system can include a first "heater phase", a second "heater and blower phase" and a third "blower only" phase. During the "heater only" phase, the APU engine and the blower 44 are off and voltage is provided to the heater 36. The amount of time the heater 36 is operated without the blower is determined by a lookup table based on the ambient temperature (as determined by temperature sensor 48) and the voltage applied to the heater 36. Ambient temperature and voltage are key inputs that affect both substrate face temperature and element sheath temperature (i.e., the temperature at the sheath that covers the heating element). In certain embodiments, the voltage can be modulated to avoid exceeding the sheath temperature limit.

Once the substrate face of the filter 32 is heated to a predetermined level during phase 1, the regeneration system moves to phase 2 in which the heater and the blower are used in combination. The intent of this phase is to sustain regeneration by continuing to operate the heating element while migrating the regeneration through the length of the entire filter 32 from the upstream face to the downstream face with the addition of air flow. The air provided by the blower also enhances combustion with the addition of oxygen. Preferably, the combustion air flow is provided by the blower 44 which is external to the APU 28 and a housing of the filter 32. The amount of time that the heater 36 and the blower 44 are operated together is determined by a lookup table based on the ambient temperature and voltage applied to the heater. Ambient temperature and voltage are key inputs that affect both substrate face temperature and filter sheath temperature. Once again, the voltage provided to the heater can be modulated in order to avoid exceeding the sheath temperature limit.

During phase 3, only the blower 44 of the regeneration system 34 is operated. The intent of this phase is to allow completion of the regeneration by continuing to provide air flow and oxygen while also allowing controlled cooling of the filter 32. The amount of time that the blower is engaged is determined by a programmable variable. Regeneration is only allowed to occur when the APU engine is not operating.

The regeneration system 34 can utilize a number of different types of regeneration triggering conditions. A regeneration triggering condition is an event or characteristic of the system that indicates that the filter 32 is likely in need of regeneration. When a regeneration triggering condition is sensed or otherwise detected, the system preferably provides an indication to the operator to make the operator aware that the filter 32 should be regenerated, and sets a flag indicating that the filter should be regenerated. Example indicators include chimes, buzzers, illuminated lights, flashing lights or other indicators. Once a regeneration indicator has been activated, the operator can initiate a regeneration event by activating the system (e.g., pushing a button, flipping a switch or otherwise initiating the regeneration). Typically, the regeneration system 34 will not allow the filter 32 to be regenerated unless a regeneration triggering condition has occurred, the regeneration indicator has been activated, and the regeneration flag has been set. However, in certain cases, the operator may override the system to regenerate the filter 32 even when a regeneration triggering condition has not been sensed or otherwise detected.

The regeneration system 34 can include a number of different types of regeneration triggering conditions. One type of regeneration triggering condition occurs when the pressure sensor 42 detects that the back pressure behind the filter 32 during operation of the APU engine exceeds a predetermined pressure level. Another regeneration triggering condition occurs when the APU engine run time since the previous regeneration exceeds a predetermined amount of time (e.g., 100-120 hours). In still another embodiment, the regeneration triggering conditions can take into consideration both the APU engine run time since the previous regeneration and back pressure. For example, a regeneration triggering condition may occur when the APU engine run time since the previous regeneration exceeds a predetermined amount of time (e.g., 100-120 hours) and the back pressure sensed by the sensor 42 is greater than a minimum level of back pressure. Further, another regeneration triggering condition can include a detected pressure fault in the system in combination with an APU engine run time since the previous regeneration that exceeds a predetermined amount of time (e.g., 50 hours). In preferred embodiments, the predetermined APU engine run time linked to a pressure fault can be less than the APU engine run time that would normally trigger a regeneration indicator when no pressure fault has been detected. An example pressure fault is if the pressure sensor becomes unplugged or short circuits so that no readings are being provided to the controller.

It will be appreciated that the regeneration system 34 can also include a number of fault conditions. When a fault condition is detected, a fault indicator (a visual indicator such as an illuminated or flashing light on a control panel or monitor, an audible indicator such as a buzzer or other indicator) can be provided to the operator. Additionally, when a fault condition is detected, depending on the fault condition, the system may prevent a regeneration event from taking place or may abort a regeneration event.

One fault condition detected by the regeneration system 34 is when the regeneration frequency occurs too often. For example, if the time between a full regeneration and a regeneration triggering condition is less than a predetermined amount of time (e.g., 20 hours of APU engine run time), a fault condition may be indicated. However, one occurrence of a short regeneration frequency is not necessarily indicative of a problem in the system. Therefore, in certain embodiments, a fault indicator may not be indicated unless a short regeneration frequency is detected a plurality of times in a row (e.g., two times, three times, four times etc.) without any intervening events in which the regeneration frequency is greater than the predetermined amount of time.

Another fault condition occurs when the back pressure sensor 42 indicates a back pressure other than zero when the APU engine is off and the blower is off.

A further fault condition occurs when the back pressure detected by the sensor 42 during operation of the APU engine exceeds a maximum limit. Typically, the maximum limit of back pressure is greater than the back pressure limit that constitutes a regeneration trigger condition. The detection of a back pressure over the maximum limit can also result in the system shutting down the APU engine.

APU engine run time and pressure can also be used in combination to detect fault conditions. For example, a fault condition can be detected if the APU engine run time since the last regeneration exceeds the regeneration trigger condition duration and the back pressure detected by the sensor 42 is less than a predetermined minimum level of back pressure. Additionally, a fault condition can be indicated if a pressure fault is detected in the system in combination with the APU engine run time being over the time limit corresponding to the regeneration trigger condition. Such a condition is likely a fault condition particularly when it occurs multiple times in a row. Therefore, if a pressure fault in combination with the APU engine run time duration since the last regeneration being over the time limit corresponding to the regeneration trigger condition occurs a first time, the system may trigger a regeneration event. However, if the same error occurs again after regeneration, the system will indicate a fault condition.

A further fault condition occurs when the APU engine run time since the last regeneration exceeds a predetermined maximum allowable time limit. The predetermined maximum allowable time limit is greater than the APU engine run time since the last regeneration that would typically trigger a regeneration event. In one embodiment, the maximum limit can be 150 hours of APU engine run time.

A further fault condition can occur if the voltage provided to the heater is not within a predetermined range. For example, a fault condition can be triggered if there have been more than a predetermined number of regenerations that were aborted due to voltages outside of the predetermined range of voltage desired to be provided to the heater.

Figure 2:
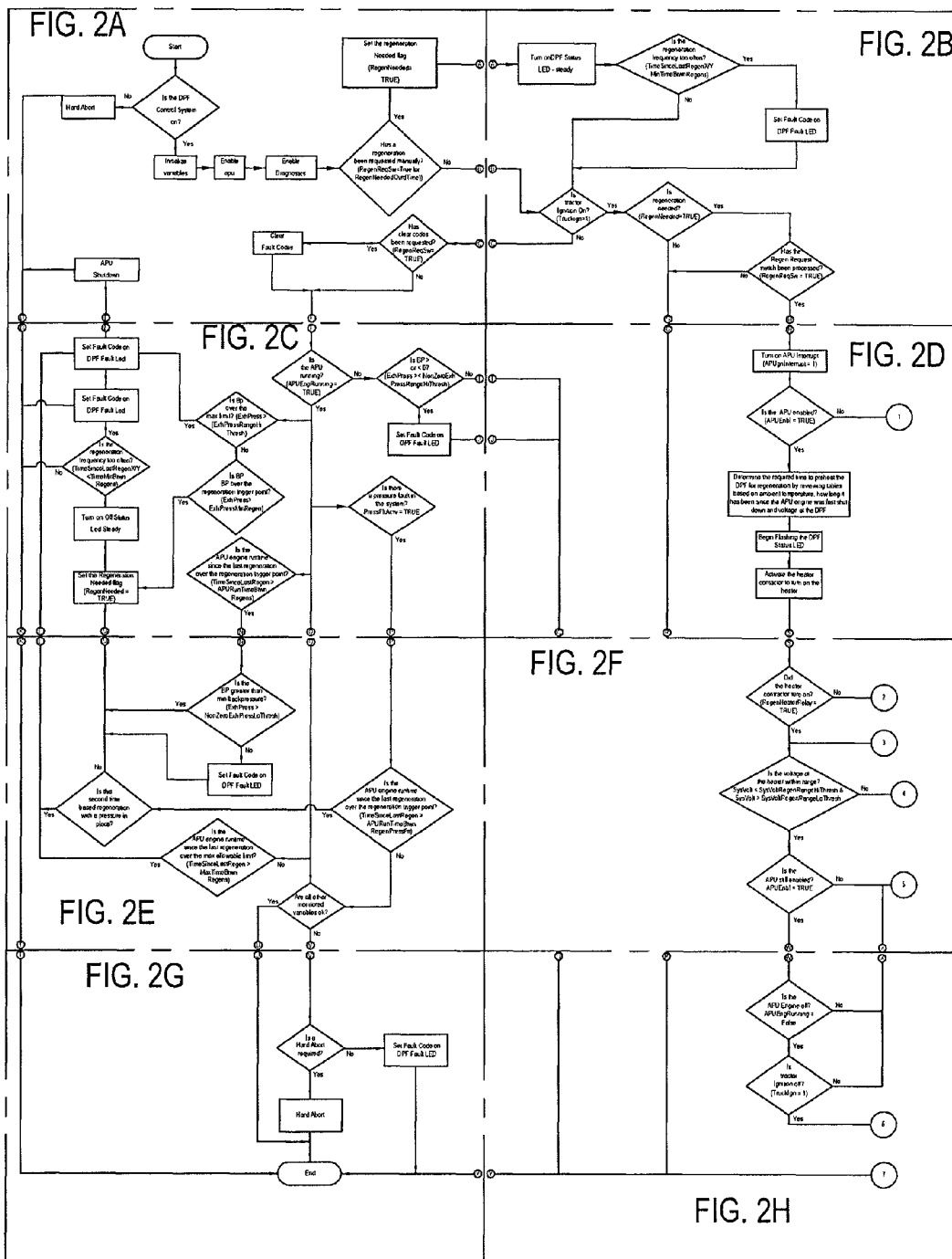
FIG. 2 is a first page of a flow chart showing a control strategy suitable for use in controlling regeneration of the exhaust filtration system of FIG. 1.
Figure 2A:
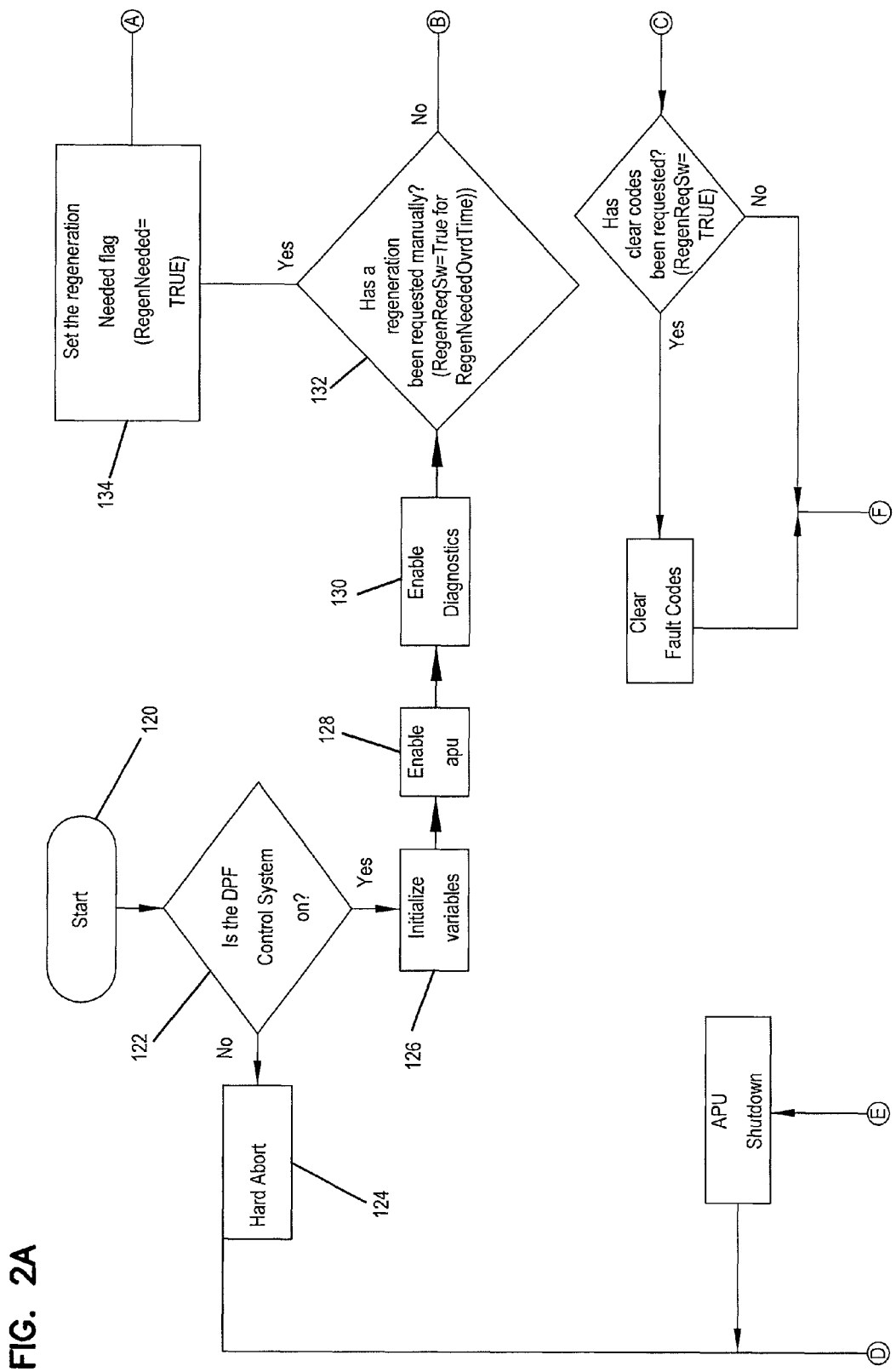
FIG. 2A is a fragmentary view of the flow chart of FIG. 2 taken within the box labeled FIG. 2A.
Figure 2B:
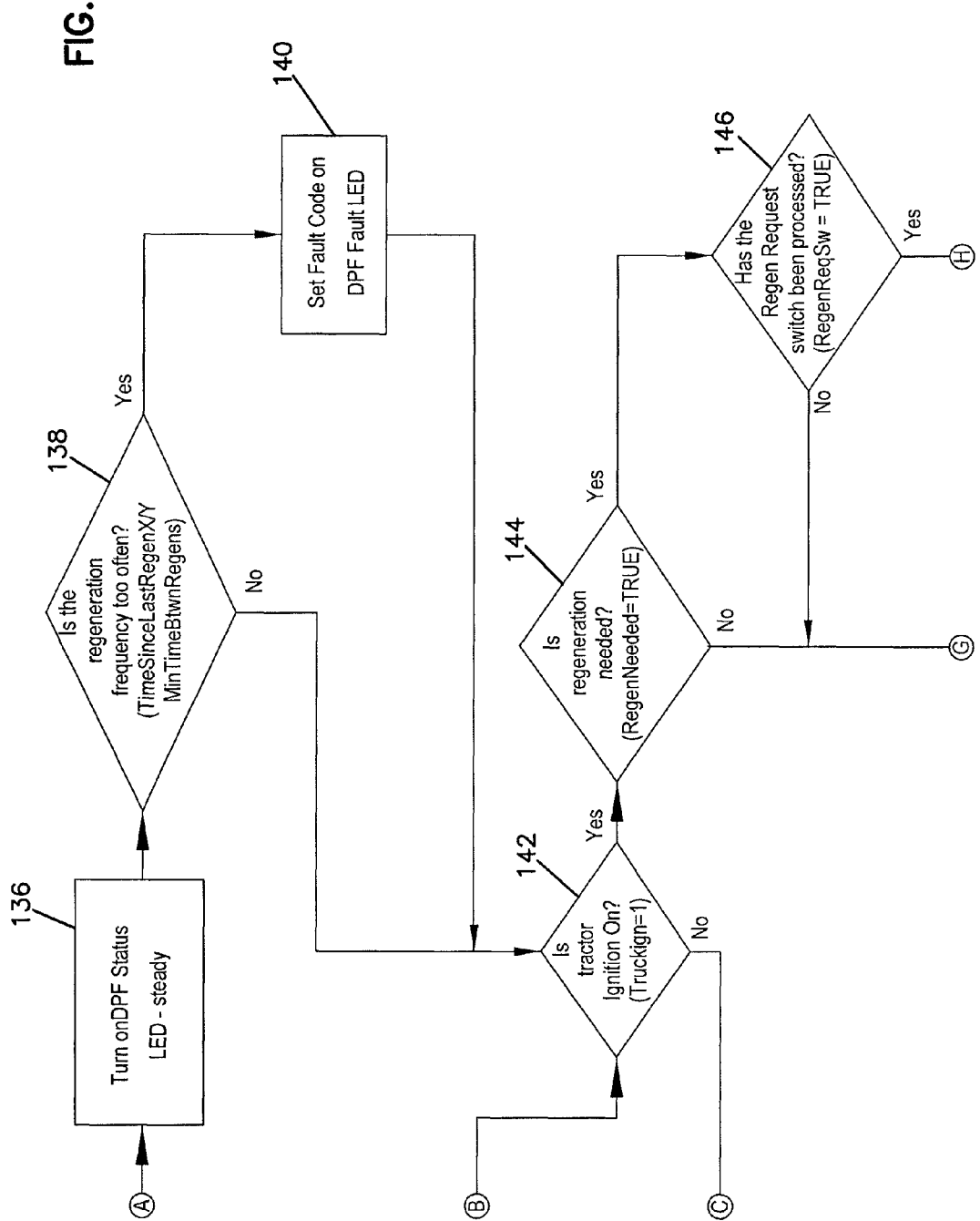
FIG. 2B is a fragmentary view of the flow chart of FIG. 2 taken within the box labeled FIG. 2B.
Figure 2C:
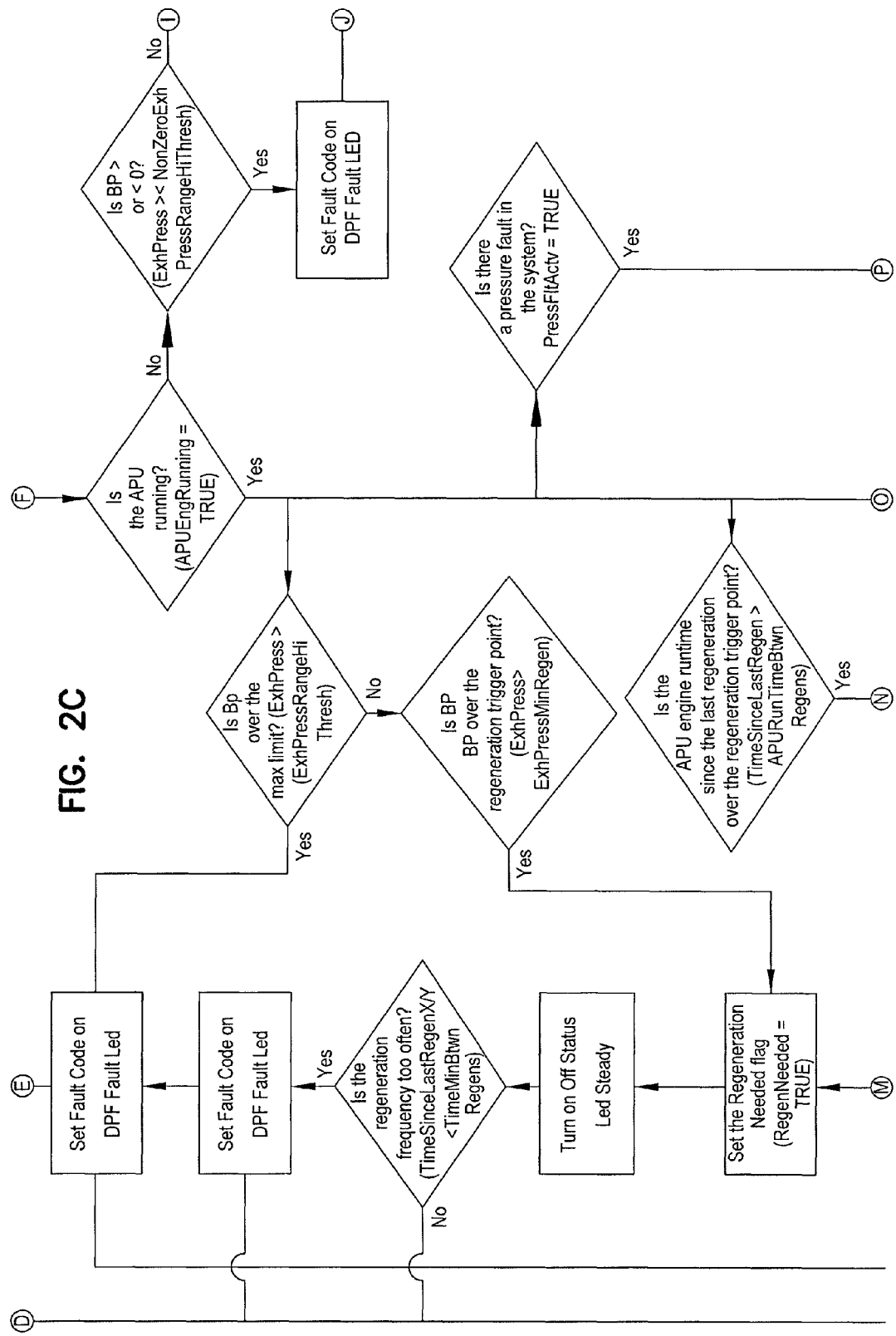
FIG. 2C is a fragmentary view of the flow chart of FIG. 2 taken within the box labeled FIG. 2C.
Figure 2E:
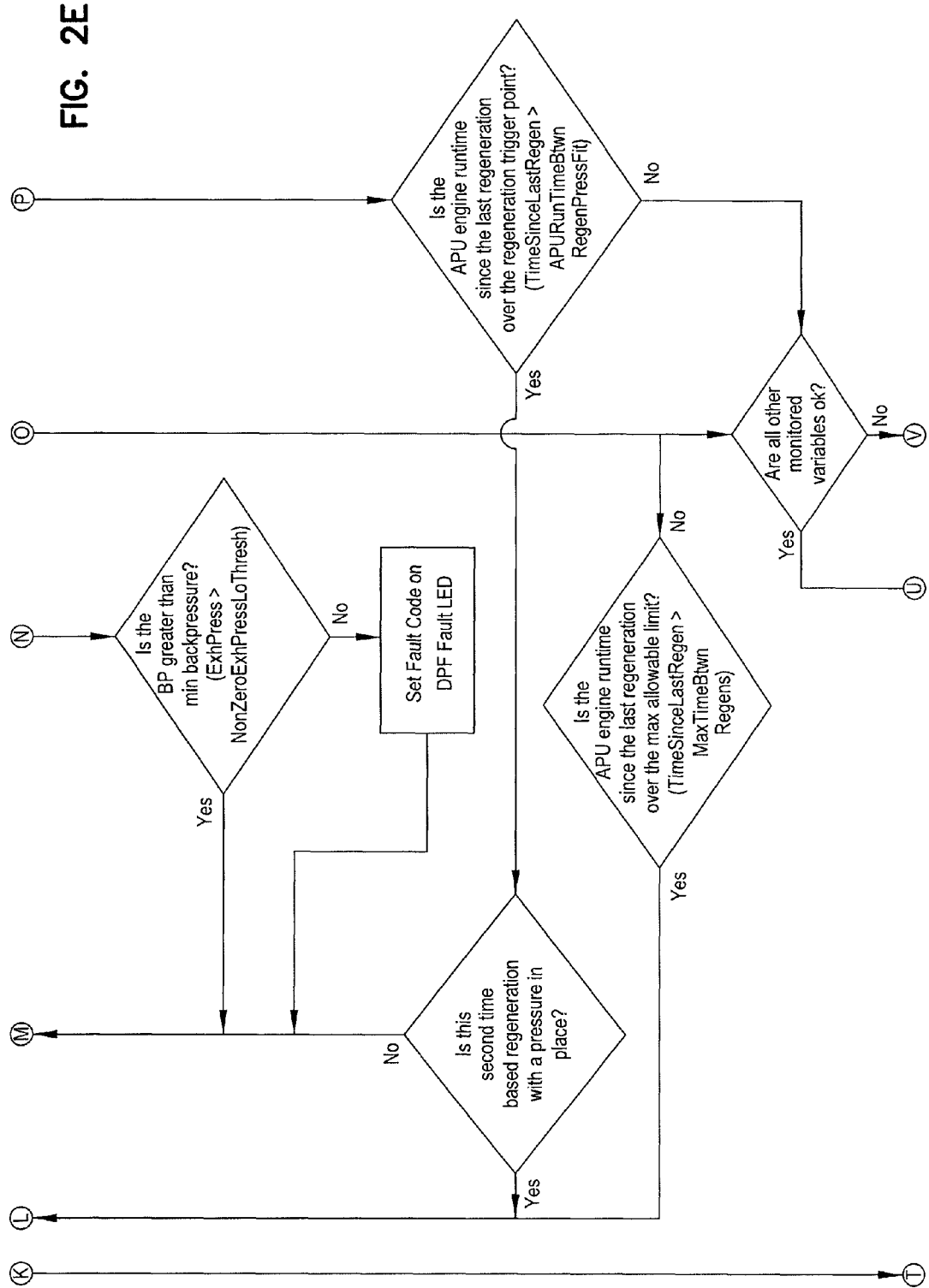
FIG. 2E is a fragmentary view of the flow chart of FIG. 2 taken within the box labeled FIG. 2E.
Figure 2F:
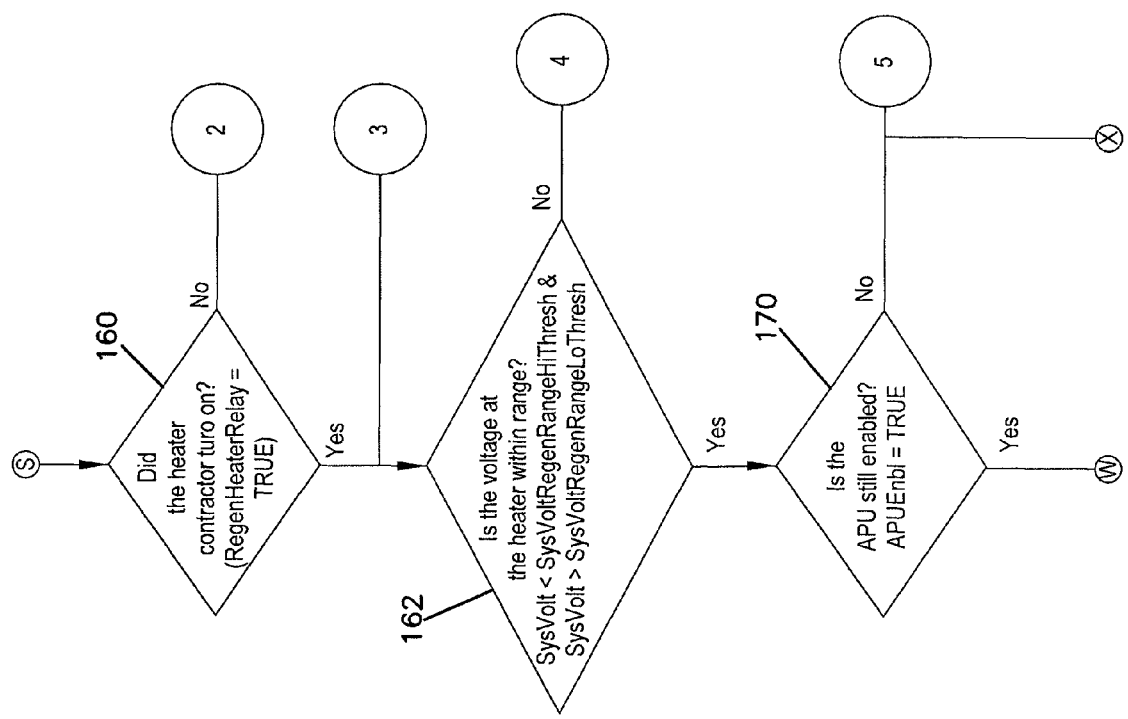
FIG. 2F is a fragmentary view of the flow chart of FIG. 2 taken within the box labeled FIG. 2F.
Figure 2G:
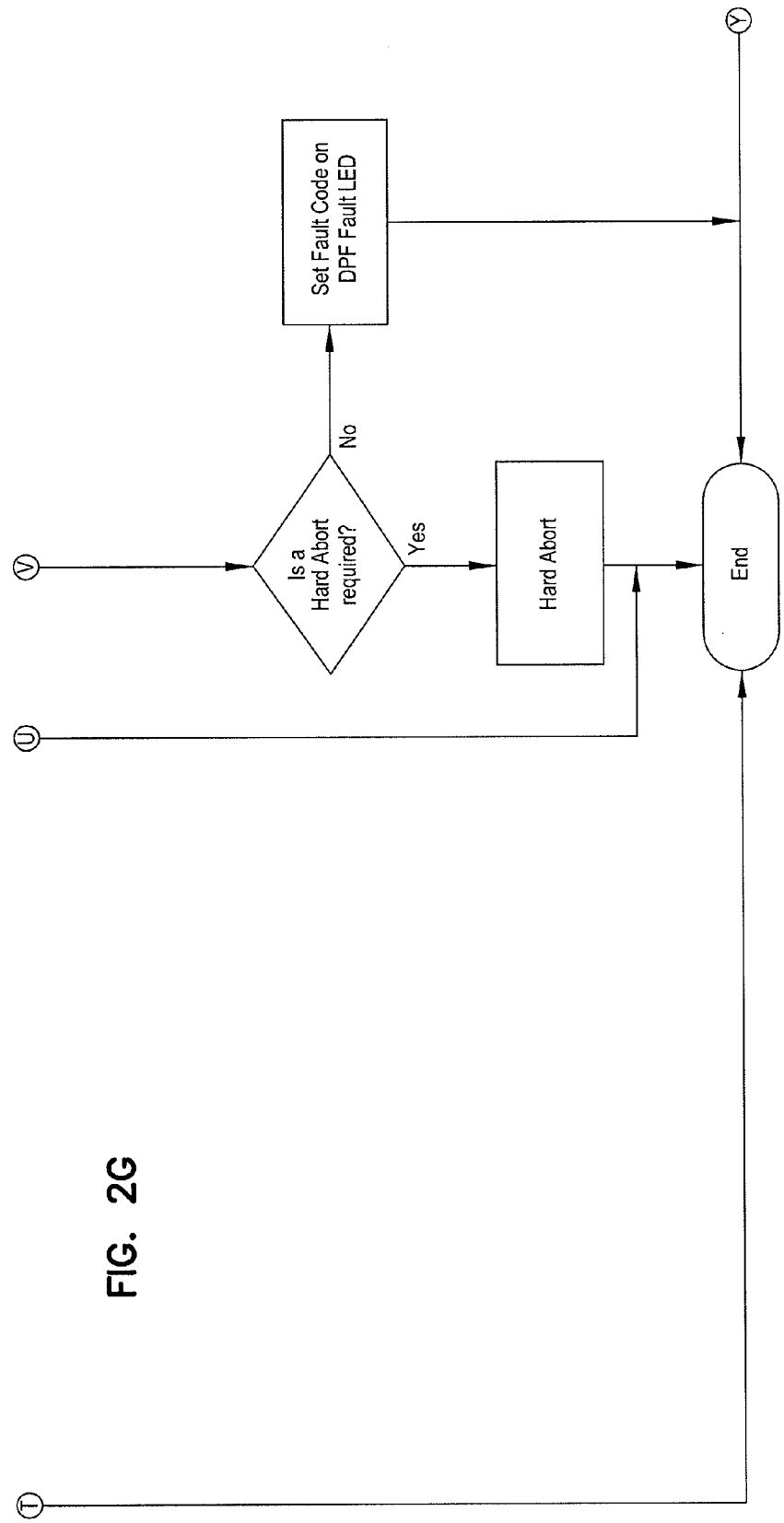
FIG. 2G is a fragmentary view of the flow chart of FIG. 2 taken within the box labeled FIG. 2G.
Figure 2H:
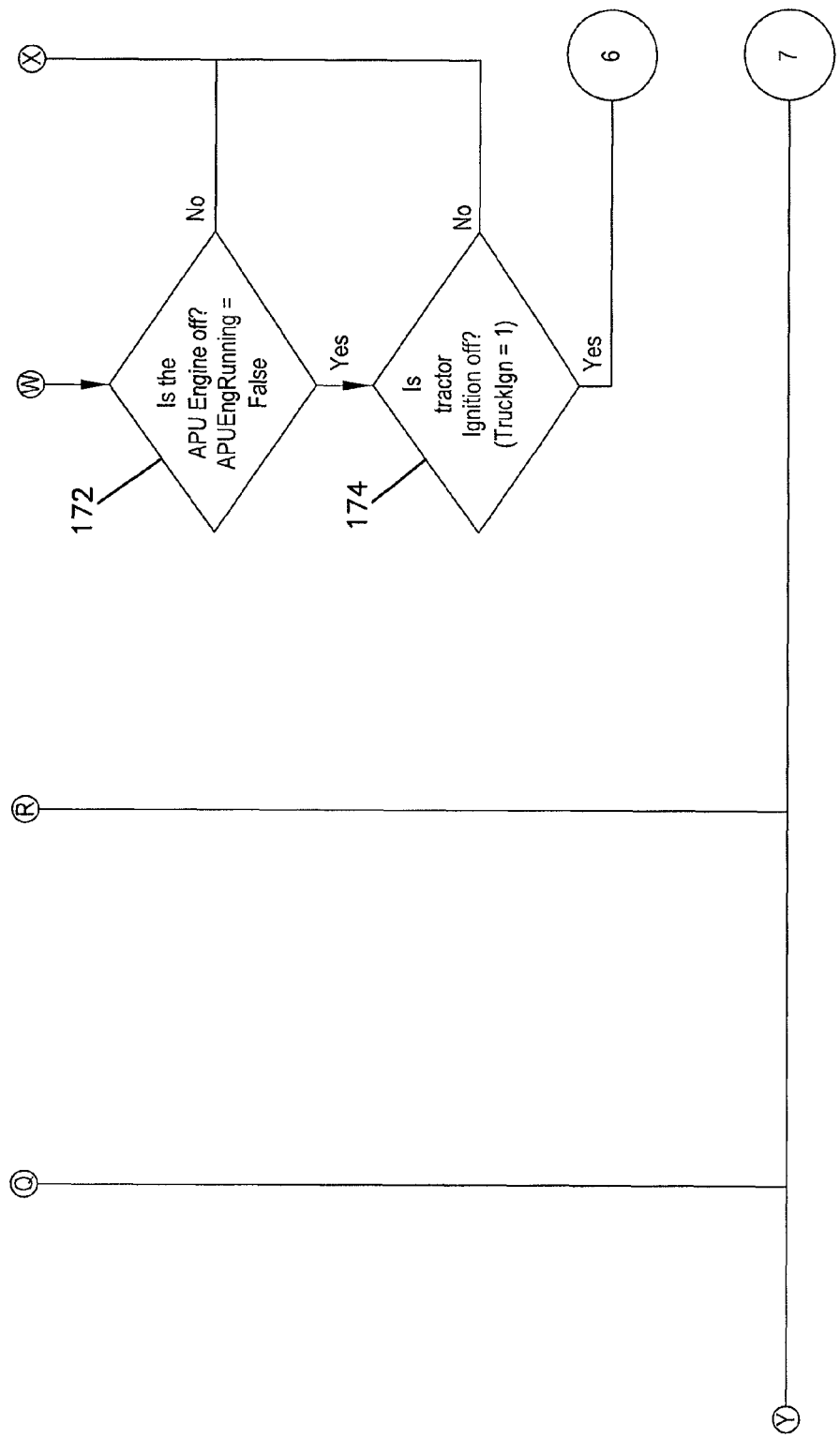
FIG. 2H is a fragmentary view of the flow chart of FIG. 2 taken within the box labeled FIG. 2H.
Figure 3:
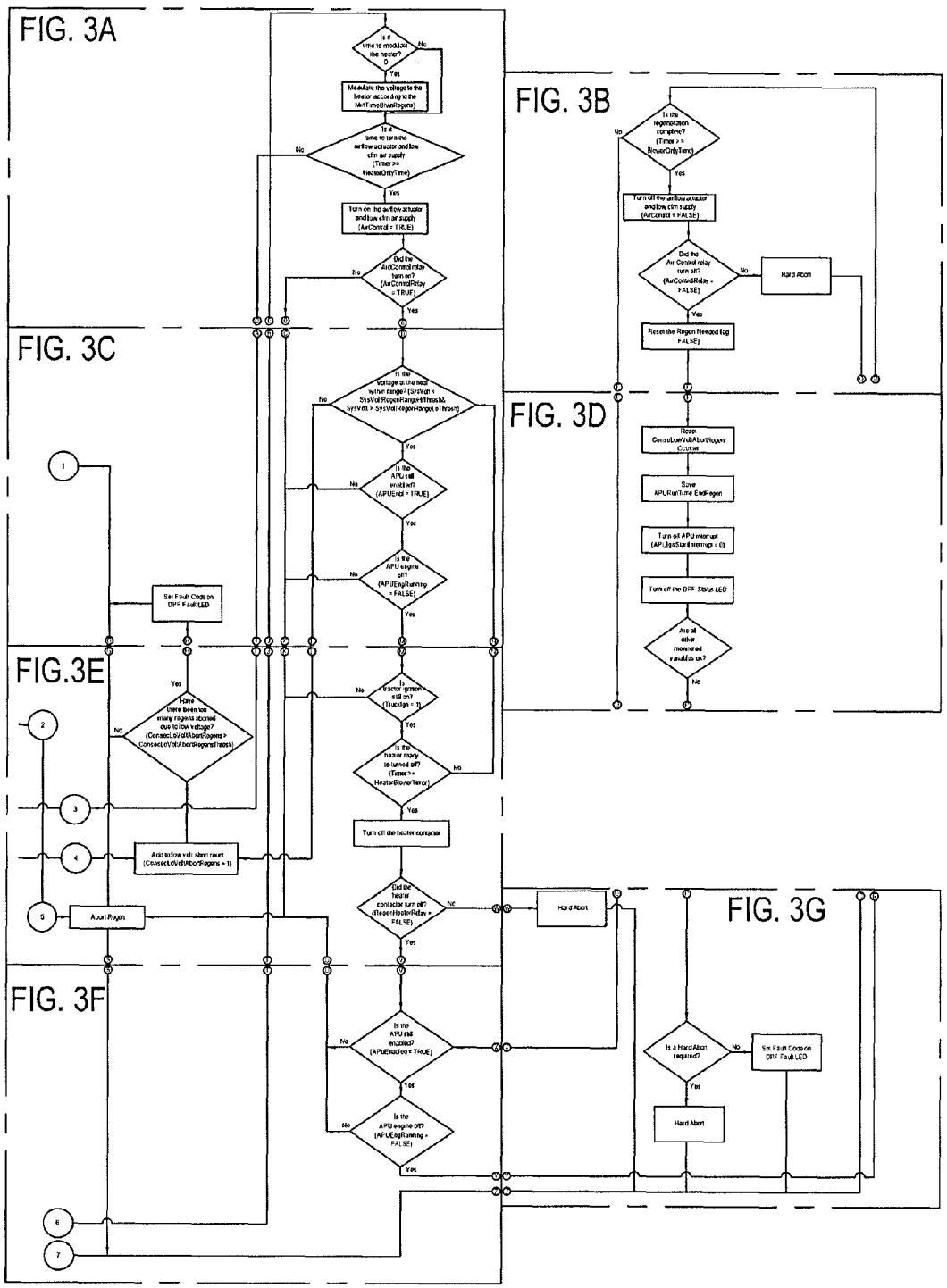
FIG. 3 is a second page of the flow chart showing a control strategy suitable for use in controlling regeneration of the exhaust filtration system of FIG. 1.
Figure 3A:
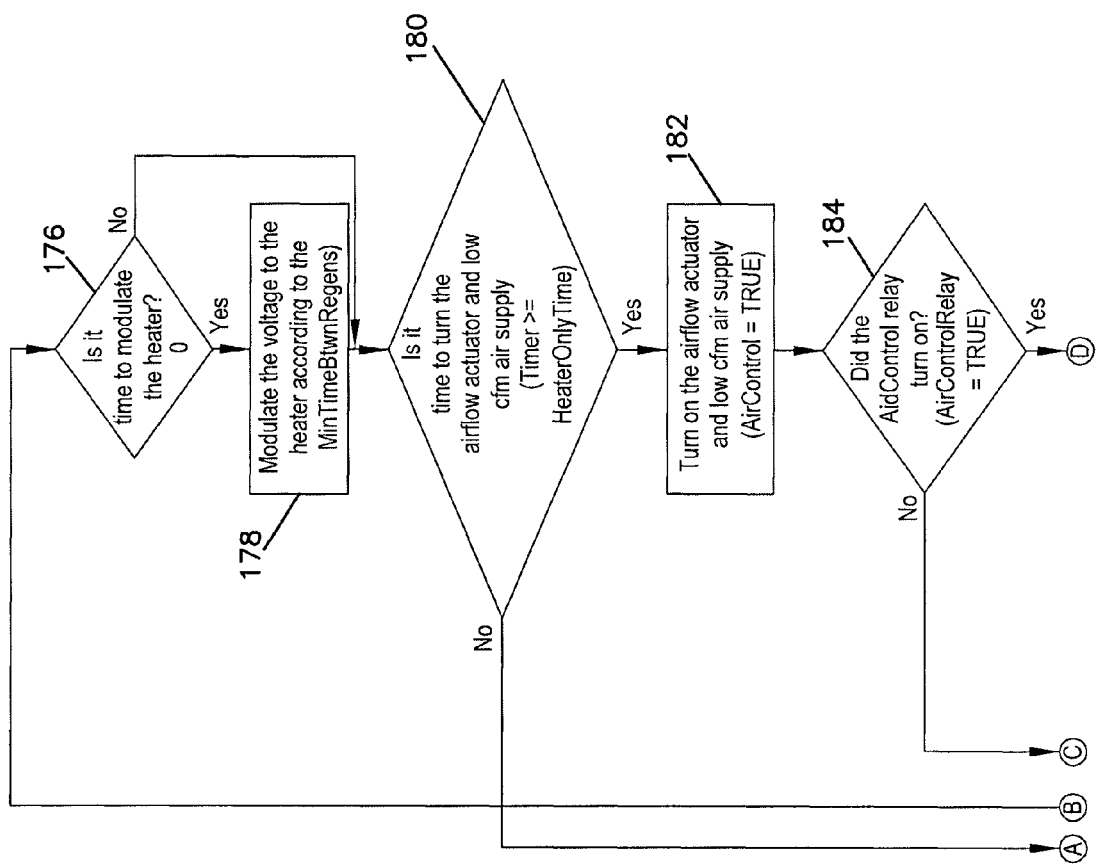
FIG. 3A is a fragmentary view of the flow chart of FIG. 3 taken within a box labeled FIG. 3A.
Figure 3B:
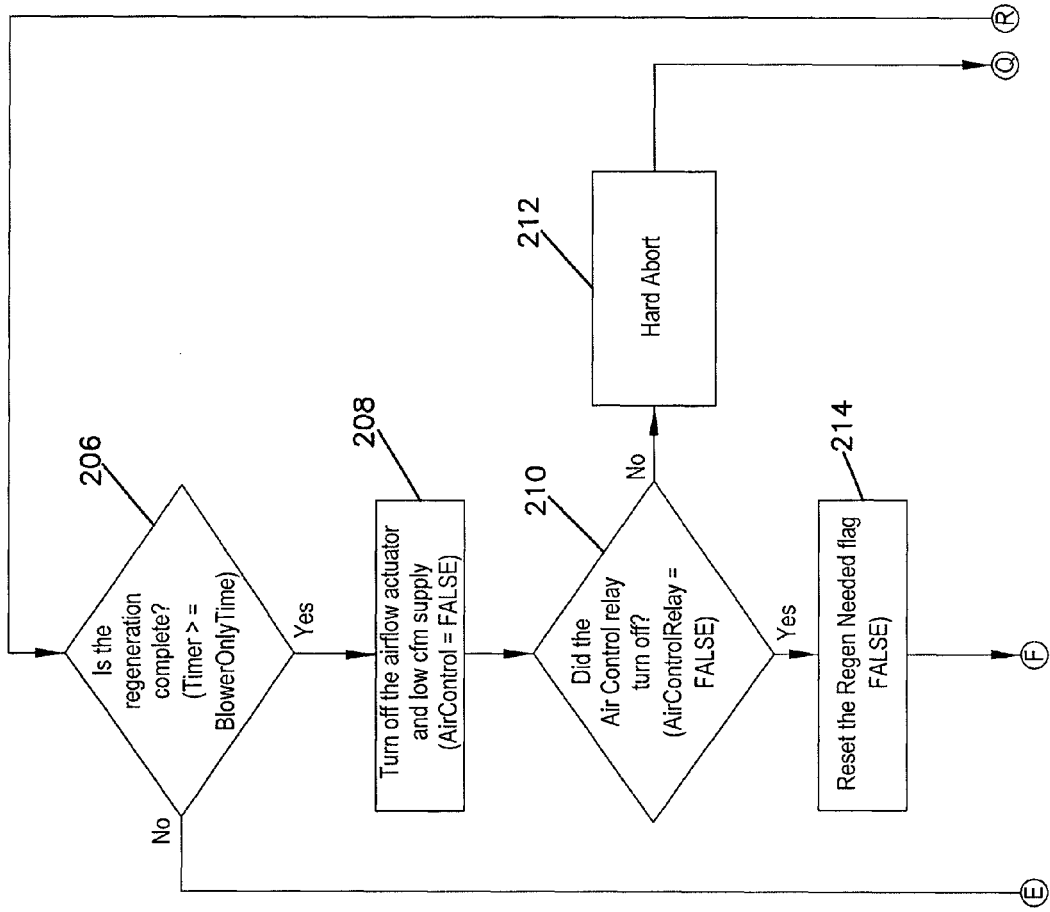
FIG. 3B is a fragmentary view of the flow chart of FIG. 3 taken within a box labeled FIG. 3B.
Figure 3C:
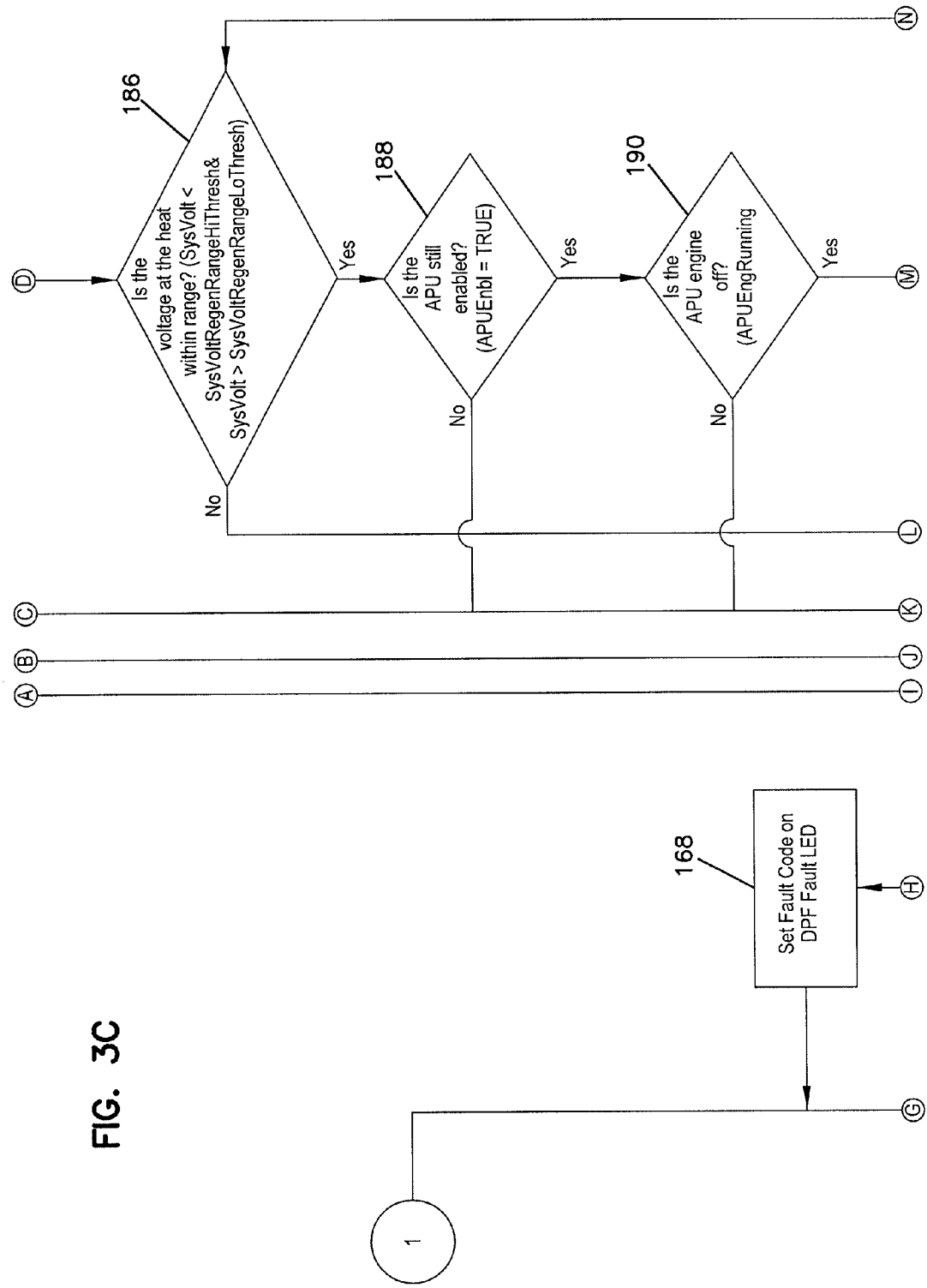
FIG. 3C is a fragmentary view of the flow chart of FIG. 3 taken within a box labeled FIG. 3C.
Figure 3D:
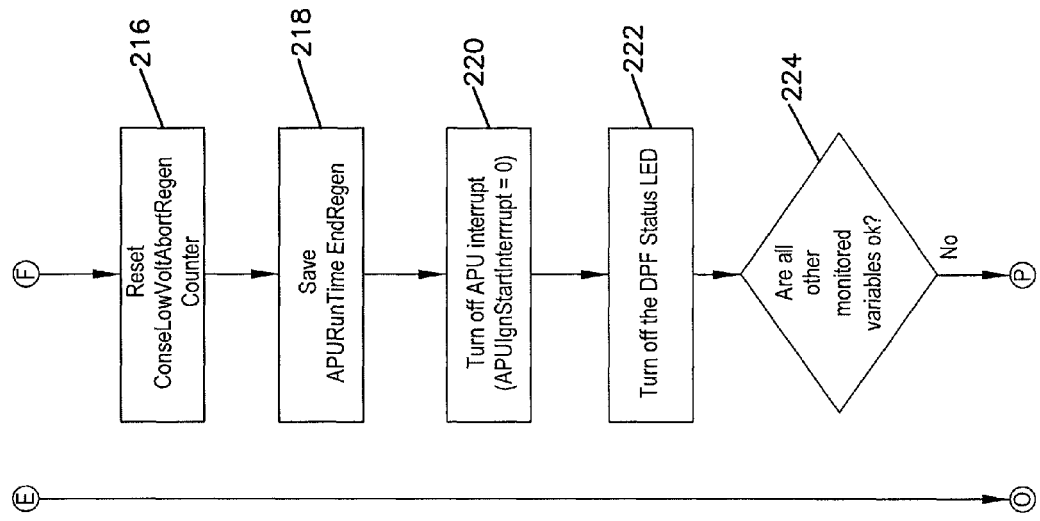
FIG. 3D is a fragmentary view of the flow chart of FIG. 3 taken within a box labeled FIG. 3D.
Figure 3E:
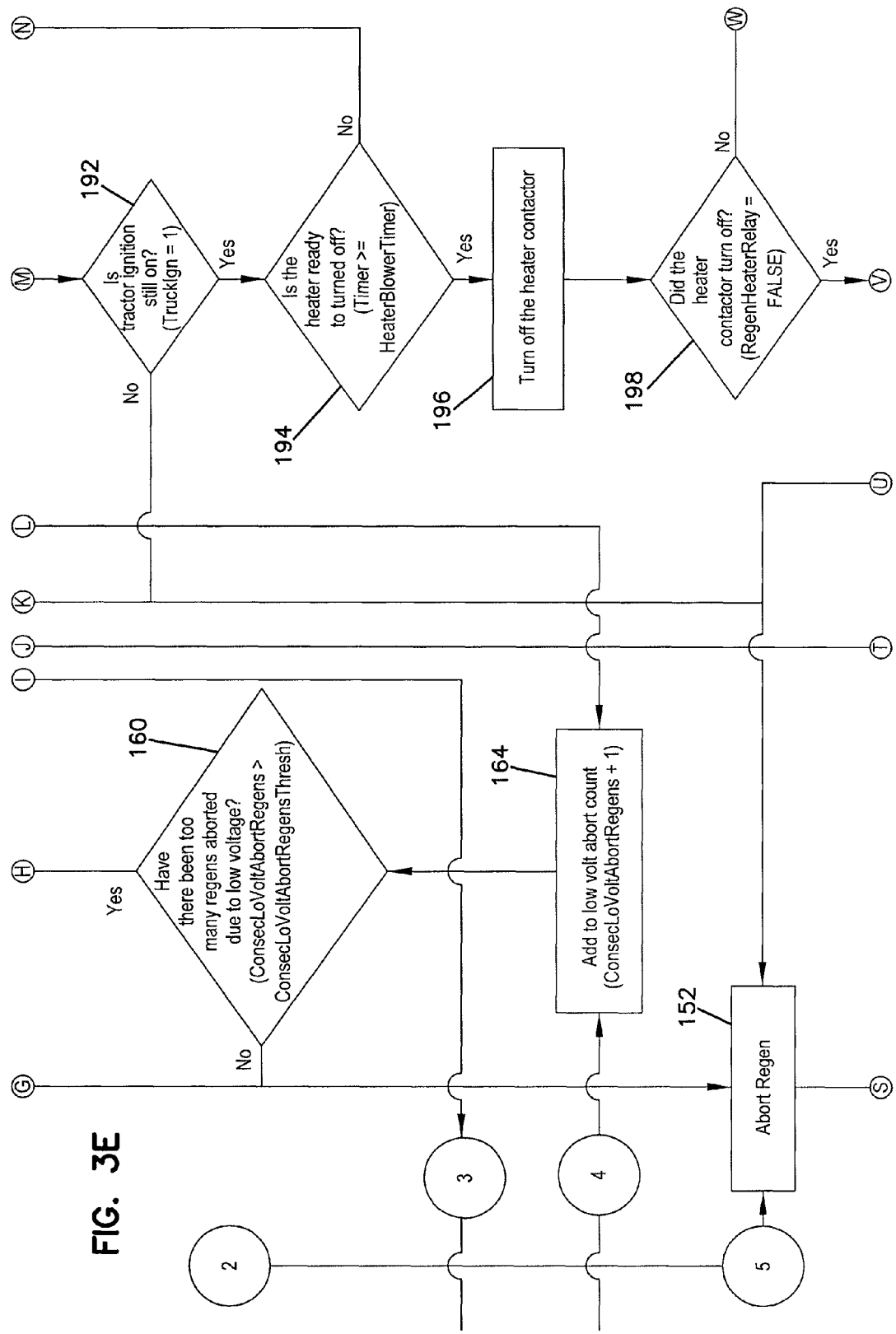
FIG. 3E is a fragmentary view of the flow chart of FIG. 3 taken within a box labeled FIG. 3E.
Figure 3F:
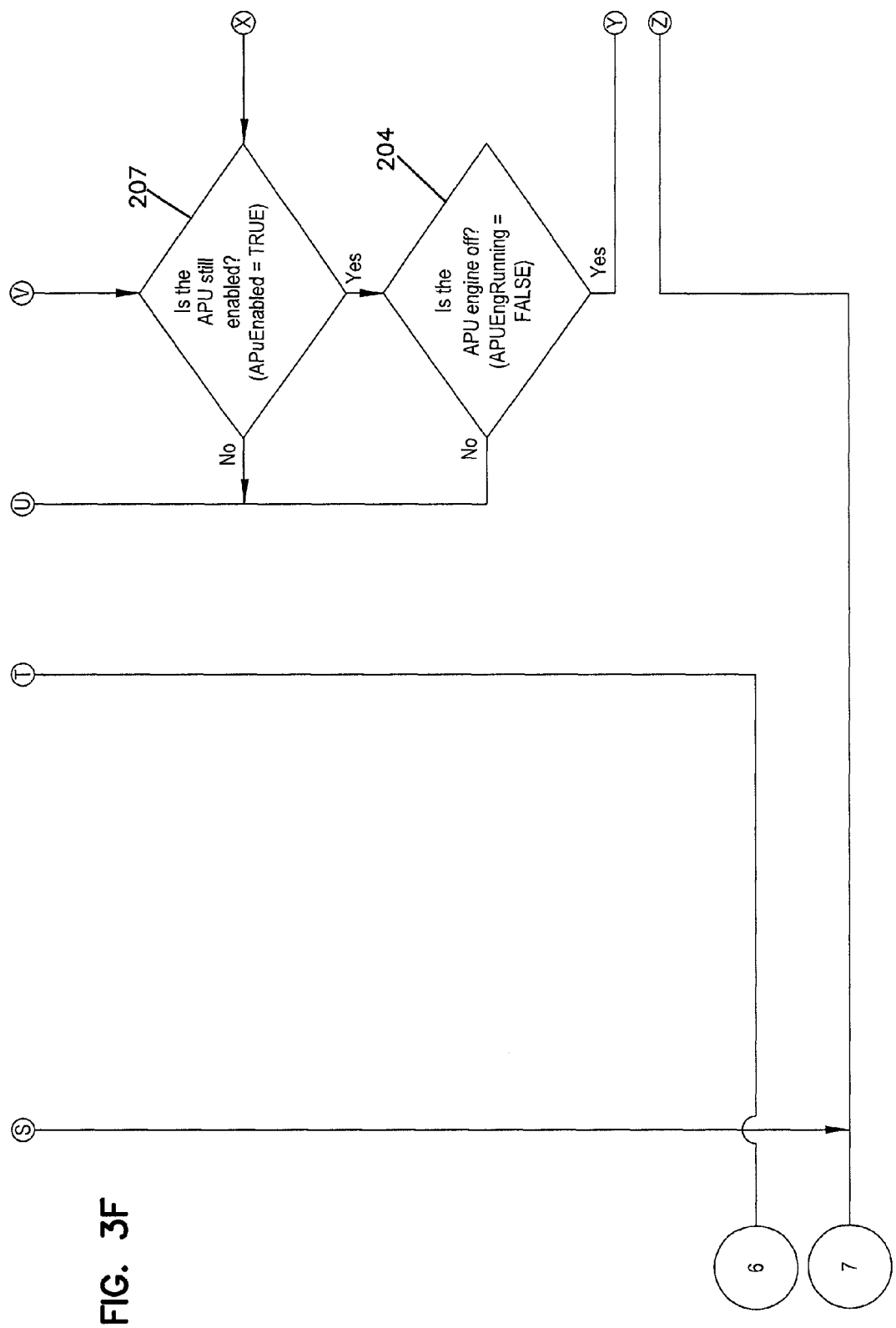
FIG. 3F is a fragmentary view of the flow chart of FIG. 3 taken within a box labeled FIG. 3F.

FIGS. 2 and 3 show a flow chart outlining example control logic that can be used for controlling the regeneration system 34 of FIG. 1. The flow chart starts at (120). Once the control system 52 has been turned on (122) the control system initializes variables (126), interfaces with the APU controller 53 (128) and enables diagnostics (130).

The system then assesses whether a regeneration event has been requested by a manual override (132). If a manual override has been requested, a "regeneration needed" flag is set (134) and a DPF status LED on display 57 is illuminated in a steady state (136). The system then determines whether the APU engine run time since the last regeneration was less than a predetermined limit (138). If the APU engine run time since the last regeneration is less than a predetermined limit, a fault condition can be triggered and a DPF fault LED on display 57 can be illuminated (140).

If the APU engine run time since the last regeneration is over the predetermined limit, the system determines whether the vehicle engine 24 is running by sensing whether the vehicle ignition 26 is on (142). Next, the system assesses whether a regeneration is needed (144). The system assesses whether a regeneration is needed by determining whether a regeneration triggering condition has been detected thereby causing a regeneration flag to be set, or whether the operator has used the override process to initiate a regeneration by manually setting a regeneration flag. If no regeneration flag has been set, the sequence ends. Otherwise, the sequence proceeds to (146) where the system determines whether the operator has pressed a regeneration request switch. If the regeneration request switch has not been pressed, the sequence ends. If the regeneration request switch has been activated, the sequence proceeds to (148) where the controller 52 turns on an APU interrupt protocol. The APU interrupt protocol prevents the APU engine from being turned on during a regeneration event.

The system then confirms that the interface between the regeneration controller 52 and the APU controller 53 is enabled (150). If not, the regeneration protocol is aborted (152). Otherwise, the controller 52 determines the required time to preheat the filter 32 for regeneration using lookup tables based on the ambient air temperature (sensed by temperature sensor 48), how long it has been since the APU engine 28 was last shut down and the voltage available to the heater 36 (154). The system then begins flashing the DPF status LED (156) on display 57 and activates the contactor 40 to turn on the heater 36 (158). The system then determines whether the contactor 40 actually turned on (160). If not, the system aborts the regeneration protocol (152). Otherwise, preheating of the filter 32 continues while the controller 52 monitors whether the voltage provided to the heater 36 is within a predetermined range (162).

If the voltage is outside the predetermined range, the system adds one count to a counter that keeps track of the number of times that regenerations have been aborted due to unacceptable voltages (164). The system assesses whether there have been too many regenerations aborted due to unacceptable voltages (166). For example, two or three aborted regenerations caused by unacceptable voltage may be considered unacceptable. If the count of regeneration abortions due to unacceptable voltages is below the predetermined level, the system aborts the regeneration event (152). Otherwise, the system proceeds to (168) which sets a fault code and illuminates a fault indicator light on the display 57 of the controller 52.

If the system assesses at (162) that the voltage provided to the heater is acceptable, the system proceeds to (170) where the system confirms that the interface between the controller 52 and the APU controller 53 is still enabled. If not, the system aborts the regeneration (152). If the voltage is acceptable, the system confirms that the APU engine is still not running (172). If the APU engine is running, the system aborts the regeneration event (152). Otherwise, the system confirms that the tractor ignition is still on (174). If the tractor ignition is not on, the system aborts the regeneration event (152). Otherwise, the system assesses whether voltage provided to the heater should be modulated (e.g., based on time or temperature) (176).

If modulation is desired, the controller 52 can cause modulation of the voltage according to voltage lookup tables (178). If no voltage modulation is needed, the system assesses whether it is time to turn on the blower 44 and valve 46 to provide air flow to the filter 32 (182). Typically, this determination is based on whether the time the heater has been on exceeds a predetermined time limit. If it is not time to activate the blower 44, the sequence proceeds back to 162. Otherwise, the blower 44 and valve 46 are actuated to provide air flow to the filter 32 (182). The controller 52 then confirms that the blower 44 and the valve 46 were effectively actuated (184). If not, the sequence proceeds to 152 where the regeneration event is aborted. If the blower and valve are operating, the system again confirms whether the voltage being provided to the heater 36 is within an acceptable range (186). If not, the sequence proceeds to 164. If the voltage is acceptable, the system again confirms that the APU is still enabled (188), that the APU is turned off (190) and that the vehicle ignition 26 remains on (192). If the answer to any of the three questions is no, the system proceeds to 152 which causes the regeneration event to be aborted.

If the answer to all three questions is yes, the system determines whether the heater 36 is ready to be turned off (194). If not, the sequence proceeds back to 186. If the heater should be turned off, the controller 52 turns off the contactor 40 (196) and then confirms that the contactor 40 was effectively turned off (198). If not, the regeneration event is aborted (200). Otherwise, the system first confirms that the APU is still enabled 202, and then confirms that the APU engine remains turned off (204). If the answer to either of these questions is no, the regeneration event is aborted (152). Otherwise, the controller determines whether the regeneration is complete (206).

If abortion of the regeneration is not necessary, the controller 52 determines whether the regeneration is complete based on whether the blower 44 has been providing air to the filter 32 for a sufficient amount of time after the heater 36 has been turned off. If the regeneration is not complete, the sequence proceeds back to 207. If regeneration is complete, the blower 44 and valve 46 are deactivated so that the blower 44 no longer provides air to the filter 32 (208). The system then confirms whether the blower 44 and valve 46 have been successfully deactivated (210). If not, the system initiates a hard abort (212). Otherwise, the system resets the regeneration needed flag (214). After the regeneration needed flag has been reset, the system also resets the counter that keeps track of the number of times the regeneration was aborted due to unacceptable voltage provided to the heater 36 (216). Next, the controller 52 saves the time the regeneration was completed and prepares to begin monitoring the run time of the APU engine 28 after completion of the regeneration event (218). Thereafter, the controller 52 turns off the APU interrupt (220) and turns off the DPF status LED on the display 57 (220).

Thereafter, the regeneration is complete unless the controller 52 detects that any other monitored variables are unacceptable (224). If a monitored variable is unacceptable, the controller 52 determines whether a hard abort is required (226). If a hard abort is required, the controller 52 initiates a hard abort (228). Otherwise, the controller 52 sets a fault code and illuminates a DPF fault LED on the controller display 57 (230).

The flow chart of FIGS. 2 and 3 also includes certain logic for detecting fault conditions and for determining whether a regeneration event has been triggered. The operation of this portion of the flow logic has already been described generally above with respect to the various fault conditions and regeneration triggers that can be incorporated into the system 34.

We claim:
1. A method for controlling a system for regenerating a diesel particulate filter:
monitoring an engine run time lapsed since a most recent regeneration event;
monitoring backpressure behind the diesel particulate filter;
triggering a first regeneration flag when the sensed backpressure exceeds a first pressure level; and
triggering a second regeneration flag when:
the engine run time lapsed since the most recent regeneration event reaches a predetermined time limit, and
the sensed backpressure exceeds a second pressure level which is lower than the first pressure level.
2. The method of claim 1, further comprising triggering a fault indicator if the engine run time lapsed since the most recent regeneration event reaches the predetermined time limit and the backpressure is below the second pressure level.

3. The method of claim 1, further comprising triggering a fault indicator if the engine run time reaches a maximum time limit.

4. The method of claim 1, further comprising triggering a fault indicator if the backpressure is equal to zero while the engine is running.

5. The method of claim 1, further comprising shutting down the engine if the backpressure exceeds a maximum value.

6. The method of claim 1, further comprising detecting a regeneration frequency fault if the first regeneration flags is triggered before the engine run time since the most recent regeneration event has reached a regeneration frequency time limit that is less than the predetermined time limit.

7. The method of claim 6, further comprising indicating a regeneration frequency fault when two or more regeneration frequency faults have been detected in succession.

8. A method for controlling a system for regenerating a filter used to filter exhaust gas generated by an auxiliary power unit of a truck, the system including a blower for providing combustion air to the filter during regeneration, and an electrical heater, the method comprising:
  operating a regeneration cycle while the truck engine is running and an engine of the auxiliary power unit is not running, the regeneration cycle including:
    a first phase where the blower is turned off and voltage is provided to the electrical heater in an amount that takes into consideration a time lapsed since the engine of the auxiliary power unit has been turned off and an ambient air temperature;
    a second phase where voltage continues to be provided to the electrical heater and the blower provides combustion air to the filter; and
    a third phase where the voltage to the heater is stopped while the blower continues to provide combustion air to the filter.

9. The method of claim 8, wherein the filter includes silicon carbide.

10. The method of claim 9, wherein the electrical heater is between ½ inch and ¼ inch of an upstream side of the filter.

11. The method of claim 8, wherein operation of the truck ignition is sensed to monitor whether the truck engine is running.

12. A system for regenerating a diesel particulate filter, the system comprising:
  a heater;
  a pressure sensor for measuring back pressure behind the diesel particulate filter;
  a control system that interfaces with the heater and the pressure sensor, the control system setting a first regeneration flag if the back pressure exceeds a predetermined first pressure limit, the control system setting a second regeneration flag if an engine run time since a most recent regeneration exceeds a first engine run time limit, and the back pressure exceeds a predetermined second pressure limit that is less than the first pressure limit, the control system setting a third regeneration flag when a pressure sensor fault is detected and the engine run time exceeds a second engine run time limit that is less than the first engine run time limit, and the system detecting a regeneration frequency fault when the first regeneration flag is set before an engine run time has reached a third engine run time limit that is less than the second engine run time limit.

13. The system of claim 12, wherein the diesel particulate filter filters exhaust from an engine, wherein the system includes a blower for moving air through the diesel particulate filter during regeneration, and wherein the pressure sensor fault is selected from the group consisting of: a) no pressure readings are being provided to the controller from the pressure sensor when the system is operating; b) pressure sensor readings from the pressure sensor indicate a back pressure other than zero when the engine and the blower are off.

14. The system of claim 12, wherein the system provides a fault indication when two or more regeneration frequency faults have been detected in succession.

15. The system of claim 12, wherein the diesel particulate filter filters exhaust from an engine having a power rating less than 12 horsepower.

16. The system of claim 12, wherein the diesel particulate filter filters exhaust from an auxiliary power unit of a vehicle, wherein the vehicle includes a vehicle engine separate from the auxiliary power unit, wherein exhaust from the vehicle engine is not filtered by the diesel particulate filter, and wherein the control system prevents regeneration of the diesel particulate filter if the vehicle engine is not running and also aborts a regeneration event if the vehicle engine is turned off during the regeneration event.

17. The method of claim 1, wherein the diesel particulate filter filters exhaust from a diesel engine having a power rating less than 12 horsepower.

18. The method of claim 1, wherein the diesel particulate filter filters exhaust from an auxiliary power unit of a vehicle.

19. The method of claim 11, wherein the regeneration cycle is aborted if the truck engine is turned off with the ignition during the regeneration cycle.

20. The method of claim 8, wherein the voltage applied to the heater is monitored during the first and second phases, wherein a voltage fault is detected if the voltage is outside a predetermined voltage range, wherein the regeneration cycle is aborted when a voltage fault is detected, and wherein a voltage fault is indicated if a predetermined number of voltage faults have been detected.

* * * * *

UNITED STATES PATENT AND TRADEMARK OFFICE
CERTIFICATE OF CORRECTION

PATENT NO. : 8,776,502 B2  
APPLICATION NO. : 12/496282  
DATED : July 15, 2014  
INVENTOR(S) : Hiemstra et al.

It is certified that error appears in the above-identified patent and that said Letters Patent is hereby corrected as shown below:

Title Page, Item (75) Inventors, should read

-- (75) Inventors: John Hiemstra, Lakeville, MN (US); Eivind Stenersen, River Falls, WI (US); Wenzhong Zhang, Savage, MN (US); Allan T. Hovda, Savage, MN (US); Gary Dale Reeves, Lakeville, MN (US); Josh Kundert, Rosemount, MN (US); Wayne M. Wagner, Apple Valley, MN (US); Todd R. Taubert, St. Paul, MN (US); Derek Hiemstra, Prior Lake, MN (US); Scott Peters, Woodbury, MN (US) --.

Signed and Sealed this  
Twenty-fourth Day of November, 2015

Michelle K. Lee  
*Director of the United States Patent and Trademark Office*